United States Patent [19]

Hanada et al.

[11] Patent Number: 4,801,229
[45] Date of Patent: Jan. 31, 1989

[54] TRANSPORTATION CONTAINER

[75] Inventors: Heiroku Hanada, Fujisawa; Yoshihiro Uesu, Tokyo; Yohei Matsuyama, Gamagori; Yuji Kato, Atsugi, all of Japan

[73] Assignee: Nippon Yusen Kaisha and Nippon Fruehauf Company, Ltd., Tokyo, Japan

[21] Appl. No.: 78,156

[22] Filed: Jul. 27, 1987

[30] Foreign Application Priority Data

Jul. 31, 1986 [JP] Japan .................................. 61-117928

[51] Int. Cl.⁴ .............................................. B60P 3/08
[52] U.S. Cl. ..................................................... 410/26
[58] Field of Search .......................... 410/26, 29, 29.1; 296/1 A; 105/368 R

[56] References Cited

U.S. PATENT DOCUMENTS 4,221,422  9/1980  Harold .................................. 410/26

Primary Examiner—Henry A. Bennett
Attorney, Agent, or Firm—Cushman, Darby & Cushman

[57] ABSTRACT

A transportation container comprises a container main body for loading two lower stage cars on a floor surface, a front deck supported on both side walls of the container main body for loading and holding one upper stage car while displacing it in the longitudinal direction relative to both of the two lower stage cars, at least a portion of the loading face for the one upper stage car being situated below the top end of the lower stage cars, a front deck guide mechanism for loading the one upper stage car by self-running on the front deck, a rear deck supported at least at the front side end thereof to both of the side walls of the container main body for loading and holding another upper stage car while displacing it in the longitudinal direction relative to both of the lower stage cars, at least a portion of the loading face for another upper stage car being situated below the top end of the lower stage cars, a rear deck guide mechanism for loading another upper stage car by self-running to the rear deck, and elevation mechanisms for elevating the decks and tucking them just below the ceiling wall of the container main body. In the container, it is possible to reduce the height, improve the working efficiency, simplify the structure and minimize the reduction of loading capacity when the container is used for loading general cargo.

4 Claims, 8 Drawing Sheets

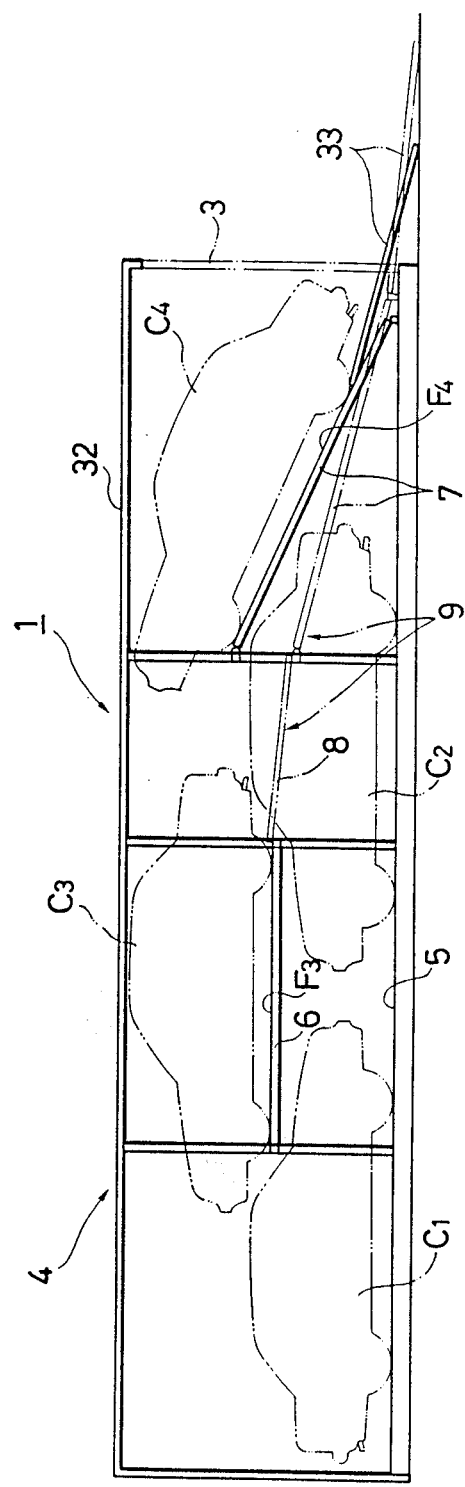

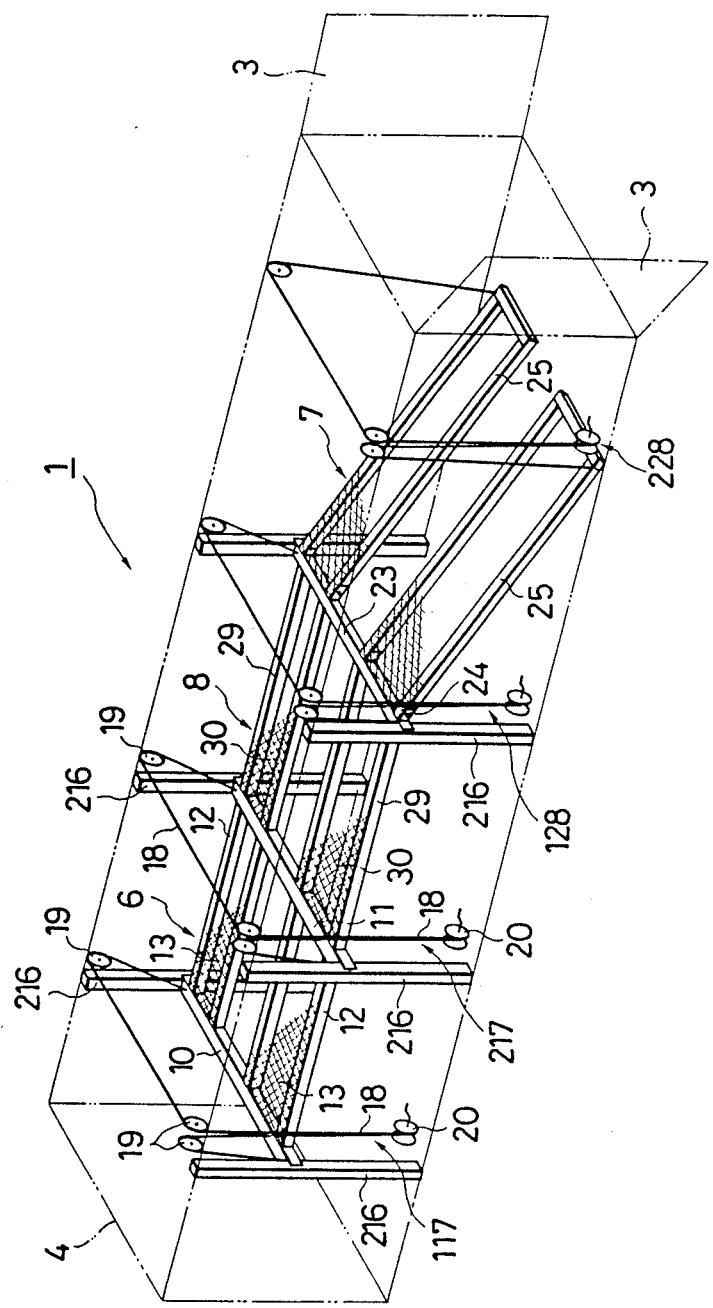

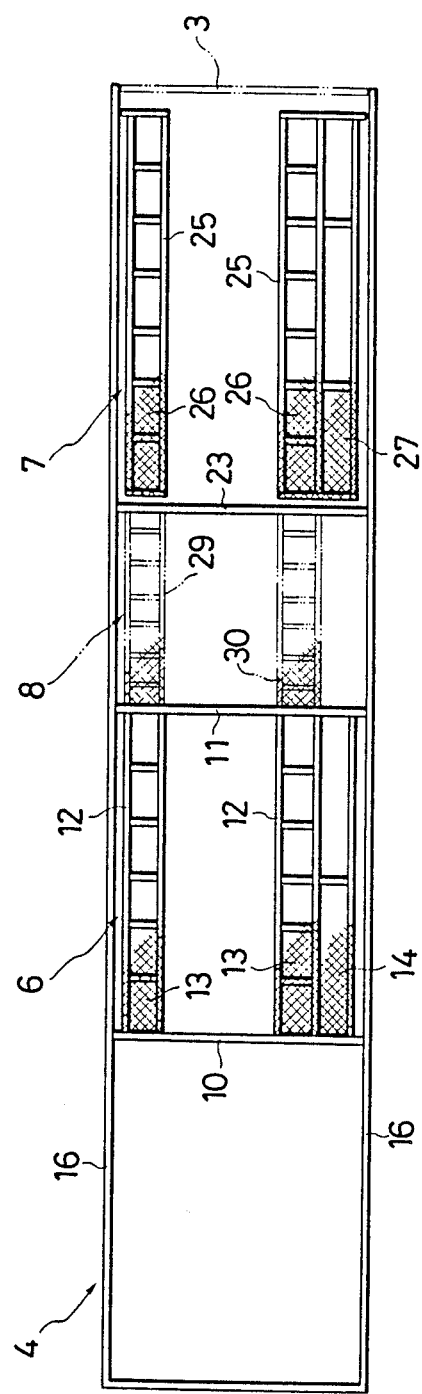

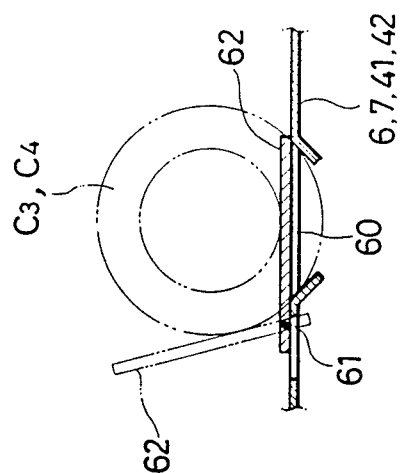
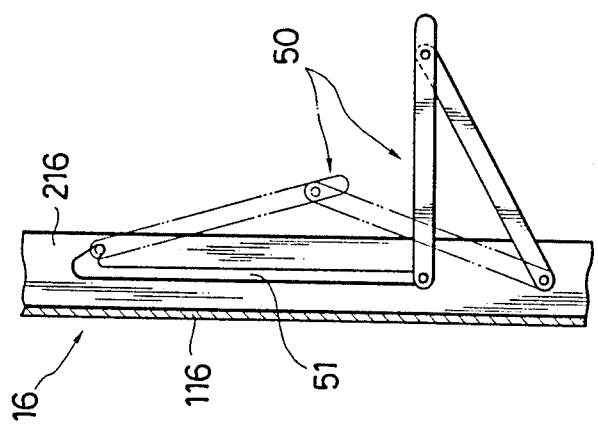

TRANSPORTATION CONTAINER

BACKGROUND OF THE INVENTION

1. Field of the Invention

This invention concerns a transportation container and, particularly, it relates to a transportation container capable of loading cars such as passenger cars in their finished state each by the number of two in the upper and the lower stages respectively while running driving them, as well as capable of being used also as a transportation container for general cargo in a case where the container is not used for loading cars.

2. Description of the Prior Art

A transportation container of the above-mentioned type has generally been known, for example, as described in Japanese Patent Publication No. Sho 60(1985)-10952. In the container, shelf members are disposed in a container main body at appropriate positions on both sides thereof and the front end of each shelf is supported vertically rotatably to the end of the container main body on the front side so that the shelf can be inclined from a horizontal state downwardly toward the end of the container main body on the side of a door by means of adequate mechanisms. Each of the shelf members is also made foldable rotationally to the inner wall surface of the container main body around the outer end edge of the shelf as the center.

In the conventional transportation container as described above, since the lower end of the car to be loaded in the upper stage, that is, the loading face of the shelf for the car is situated above the top end of the car loaded in the lower stage, the height of the container main body is remarkably increased as compared with that of an ordinary container. This causes various problems, for example, the number of the containers stacked vertically is restricted upon disposing them in a hatch or on a deck and a large step (difference in the height) is formed relative to adjacent ordinary containers, if any, which brings about inconveniency upon loading a plurality of large cargoes not contained in the container while placing them over a plurality of containers, or upon fastening the containers.

Further, in the case of transporting the transportation containers on land while mounting them on trailer vehicles, since the height of the container main body is large, it may happen that the total height often exceeds the limit for the height specified by legal regulations enforced in the relevant countries. In such a case, a cargo has to be transported after being transferred to other transportation means and this significantly worsens the overall efficiency of transportation including marine transportation.

Furthermore, in the conventional transportation container, after loading a finished car by self-running on a slanted shelf, the end of the shelf on the side of the container door has to be lifted by using a large-sized chain block or the like. This complicates the structure regarding the shelf and its related components, as well as brings about difficulty in the operation since a heavy weight loads have to be lifted. In addition, the large-sized chain block or the like may hinder the operation in the case of using the container as an ordinary dry container to worsen the operation efficiency.

Further, in the conventional transportation container, since the shelf is folded against the inner wall surface of the container main body when the latter is used as an ordinary dry container, the effective width of the container main body is reduced by so much as the folding thickness of the shelf at each of the side walls, that is, twice the folding thickness of the shelf, thereby decreasing the loading capacity of general cargoes.

OBJECT OF THE INVENTION

Accordingly, it is an object of the present invention to provide a transportation container capable of loading cars in their finished state each by the number of two in the upper and the lower stages respectively while driving themselves, capable of facilitating the loading procedures, not requiring lifting operation for heavy weight matters after loading the cars, capable of being transported on land with no troubles when mounted on trailers, and capable of loading general cargo while minimizing the reduction in the loading capacity when the container is not used for loading cars.

Another object of this invention is to provide a transportation container in which the number of multifunction members is increased, thereby simplifying the structure and reducing the total weight.

SUMMARY OF THE INVENTION

The foregoing objects can be attained by a transportation container in accordance with the present invention, the transportation container comprising:

a container main body in which two cars in their finished stage are loaded on a floor surface, a front deck supported on both side walls of the container main body respectively, adapted to load and hold a finished car on the upper stage above the floor surface while displacing it in the longitudinal direction relative to both of the cars on the floor surface, in which at least a portion of the loading face for the car on the upper stage is situated below the top end of the cars on the floor surface.

a front deck guide mechanism for loading cars on the upper stage by self-running on the front deck, a rear deck at least the end thereof on the front side is supported by both of the side walls of the container main body respectively, adapted to load and hold a finished car on the upper stage while displacing the position in the longitudinal direction relative to both of the cars on the floor surface, in which at least a portion of the loading face for the car on the upper stage is situated below the top end of the cars on the floor surface, a rear deck guide mechanisms for loading the finished car on the upper stage by driving on the rear deck, and elevation mechanisms for moving the respective decks upwardly and tucking them just below the ceiling wall of the container main body.

In the present invention, since at least a portion of the loading face of each of the decks for loading the cars on the upper stage is situated below the top end of the cars on the floor surface, the cars on the upper stage and the floor surface are loaded while being partially overlapped with each other in the vertical direction and the height of the transportation container can be decreased by so much. Further, the cars on the upper stage to be loaded on both of the decks are loaded by using each of the guide mechanisms while driving the cars there is no requirement to displace both of the decks after the loading, which can provide an improvement in the working efficiency. Further, since both of the decks are adapted to be moved upwardly by the elevation mechanisms and tucked just below the ceiling wall of the container main body, general cargo can be loaded while minimizing the reduction in the loading capacity. In addition, since the elevation mechanisms lift both of the decks not carrying the cars, mechanisms can be made smaller in the size, reduced in the weight and simplified in the structure, and they are not a hindrance upon loading general cargo.

DESCRIPTION OF THE ACCOMPANYING DRAWINGS

These and other objects, as well as advantageous features of the present invention will become apparent by reading the following descriptions referring to the accompanying drawings; wherein FIG. 1 is an entire schematic view of a container illustrating the first embodiment according to the present invention;

FIG. 2 is a perspective view of the container:

FIG. 4 is a plan view of the container;

FIG. 9 is an explanatory view illustrating a portion of a third embodiment according to the present invention;

FIG. 10 is an explanatory view illustrating a portion of a fourth embodiment according to the present invention;

DETAILED DESCRIPTION OF THE INVENTION

Figure 5:
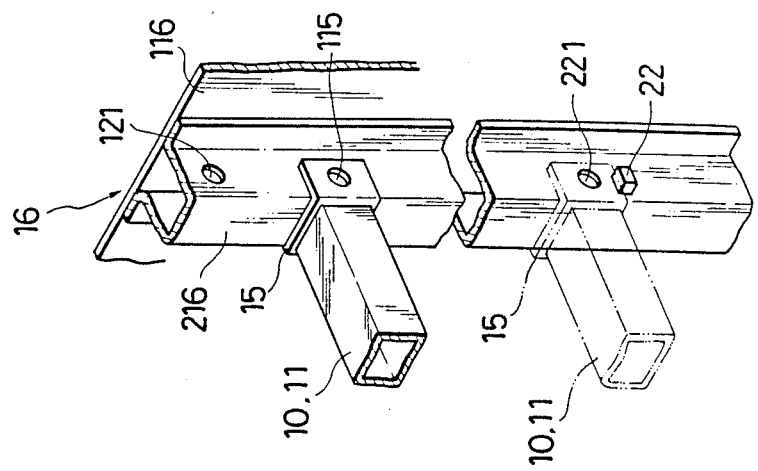
FIG. 5 is an enlarged view for a portion of the container shown in FIG. 2.

The first embodiment according to the present invention will be explained while referring to the drawings.

Figure 3:
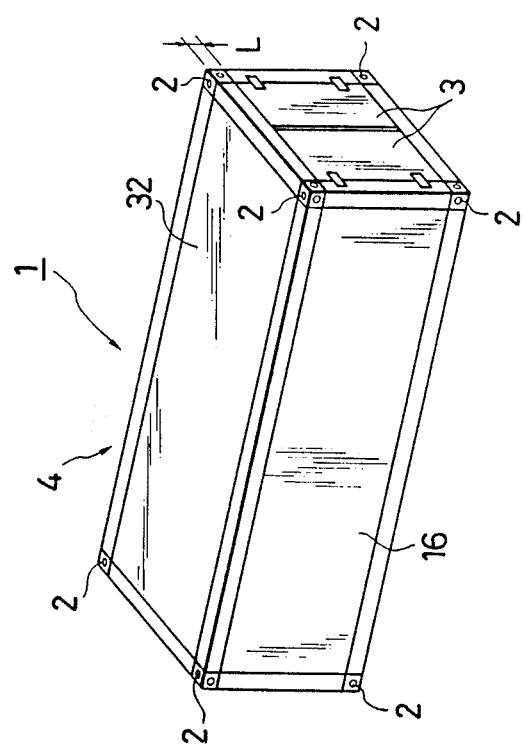
FIG. 3 is an outer view for the container.

FIG. 1 through FIG. 3 show a container as one embodiment of a transportation container according to the present invention. A container 1 comprises a box-type container main body 4 having a corner casting 2 at each of four corners on upper and lower ends and having a door 3 at one longitudinal end, in which a first car and a second car (hereinafter $C_1$ and $C_2$) in their finished state (finished cars mean herein those cars capable of self-runing, e.g., by their own engines) are loaded with their front parts face-to-face with each other on the floor surface 5 of the container main body 4 as shown in FIG. 1.

As shown in FIG. 1, a front deck 6 for loading and holding a finished third car (hereinafter $C_3$) at a position above and between both of the cars $C_1$ and $C_2$ and the loading face $F_3$ of the front deck 6 for the car $C_3$ is situated at a position below the top end of both of the cars $C_1$ and $C_2$ so that the cars $C_1$, $C_2$ and $C_3$ can be loaded while partially overlapped with each other in a vertical direction. Thus, the cars can be loaded in the upper stage and the floor surface without increasing the height of the container main body 4. The structure and the function of the front deck 6 will be described later specifically.

As shown in FIG. 1, in the space at the end of the container main body 4 on the side of the door 3, a rear deck 7 is disposed a downward slope toward the door 3 for loading and holding a fourth finished car (hereinafter $C_4$) on the upper stage with. The loading face $F_4$ of the rear deck 7 for the car $C_4$ is situated, at least at the lower end thereof, below the top end of both of the cars $C_1$ and $C_2$, so that a portion of the car $C_4$ is overlapped with both of the cars $C_1$ and $C_2$ in the vertical direction upon loading.

The finished cars $C_1$ and/or $C_2$ on the floor surface 5 will be referred to as lower stage cars $C_1$ and/or $C_2$ or, simply, as cars $C_1$ and/or $C_2$ while the finished cars $C_3$ and/or $C_4$ will be referred as upper stage cars $C_3$ and/or $C_4$ or, simply, as cars $C_3$ and/or $C_4$ in the specification and the appended claims.

The rear deck 7 is disposed at a great angle of inclination as shown by the solid line in FIG. 1, so that the upper stage car $C_4$ can be loaded directly by driving. That is, the rear deck 7 also serves as a rear deck guide mechanism for loading the upper stage car $C_4$ by driving on the rear deck 7. While on the other hand, in the case of loading the upper stage car $C_3$ on the front deck 6, the rear deck 7 is set at a moderate angle of inclination as shown by the dotted chain line in FIG. 1, so that it constitutes a front deck guide mechanism 9 together with an intermediate deck 8 which is laid between both of the decks 6 and 7 for loading the upper stage car $C_3$ by driving on the front deck 6. The details for them will be described later specifically.

As shown in FIGS. 2 and 4, the front deck 6 comprises a front lateral beam 10, a rear lateral beam 11 and two ladder-like connection members 12 for connecting both of the lateral beams 10 and 11. An upper face member 13 such as made of mesh is disposed to the upper surface of each of the connection members 12. Both of the connection members 12 are disposed while being displaced rightwardly when viewed from the side of the door 3 (upwardly in FIG. 4) assuming the case where the car handle is attached on the left in the upper stage car $C_3$ as shown in FIG. 4, so that a driver after loading the upper stage car $C_3$ by driving the car on the front deck 6 can easily get off the car. In FIG. 4, an auxiliary deck 14 is disposed to the left of the connection member 12 situated on the left (lower side in FIG. 4) that can be utilized as a passage for a driver or as a foothold for an operator upon fastening the upper stage car $C_3$ to the front deck 6.

As shown in FIG. 5, a guide metal 15 of a U-shaped transverse cross section is attached to both ends for each of the lateral beams 10 and 11 respectively, and each of the guide metals 15 is engaged to a support post 216 that constitutes the side wall 16 of the container main body 4 together with an outer wall 116 and an inner wall (not illustrated). As shown in FIG. 2, the front deck 6 is so adapted that it can be moved up and down between a tucking position at the upper end of each of the support posts 216 to a deck setting position at the intermediate position of each of the support posts 216 along each of the support posts 216 as a guide when a pair of front deck elevation mechanisms 117 and 217 are operated simultaneously.

As shown in FIG. 2, each of the front deck elevation mechanisms 117 and 217 comprises a lift wire 18 connected at one end thereof to both ends for each of the lateral beams 10 and 11, pulleys 19 around which the lift wire 18 is wound and a winch 20 for winding the other end of the lift wire 18. While not illustrated specifically, the pulleys 19 and the winch 20 are incorporated into the wall thickness of the side wall 16 so that each of the front deck elevation mechanisms 117 and 217 gives no hindrance when the container 1 is used as an ordinary dry container. Pin insertion holes 121 and 221 are disposed at the upper end and the intermediate position on the side of each of the support posts 216, respectively, for guiding the up and down movement of the front deck 6, so that the front deck 6 may be secured to the tucking position and to the deck setting position by aligning each of the pin insertion holes 121 and 221 with the hole 115 disposed in each of the guide metals 15 and inserting pins (not illustrated) therethrough. Further, as shown in FIG. 5, a stopper 22 is disposed at a position below the pin insertion hole 221, for inhibiting further lowering of the front deck 6 when it is lowered along with each of the supports posts 216, so that the front deck 6 can easily be positioned to the deck setting position.

Figure 6:
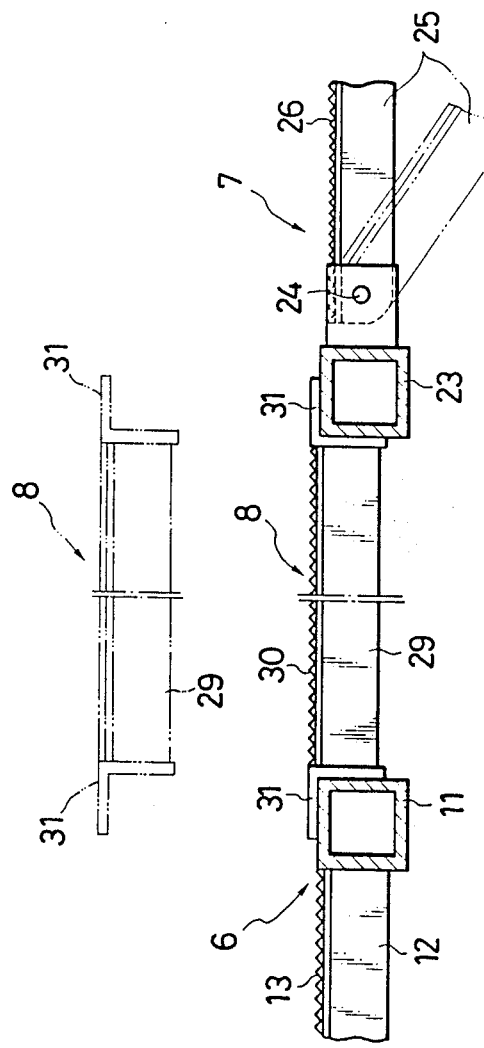
FIG. 6 is an explanatory view illustrating the state of handling each of decks.

As shown in FIGS. 2, 4 and 6, the rear deck 7 comprises a lateral beam 23 and two ladder-like connection members 25, the ends on the front side of which are swingeably connected to the lateral beam 23 by way of pins 24. An upper surface member 26 such as a mesh is disposed to the upper surface for each of the connection members 25. As shown in FIG. 4, both of the connection members 25 are disposed while being displaced rightwardly as viewed from the side of the door 3 (upwardly FIG. 4) in the same manner as the connection members 12 for the front deck 6. An auxiliary deck 27 used in the same manner as the auxiliary deck 14 is disposed to the left of the connection member 25 on the left side (lower side in FIG. 4).

As in the cas of both of the lateral beams 10 and 11 for the front deck 6, a guide metal (not illustrated), which is caused to slide up and down along the support post 216 of the side wall 16 and secured to a predetermined height by means of a pin, is disposed to both ends of the lateral beam 23 respectively and supported by the side wall 16. The end of the connection member 25 on the side of the door 3 is placed on and supported by the floor surface 5 upon loading the car.

Figure 7:
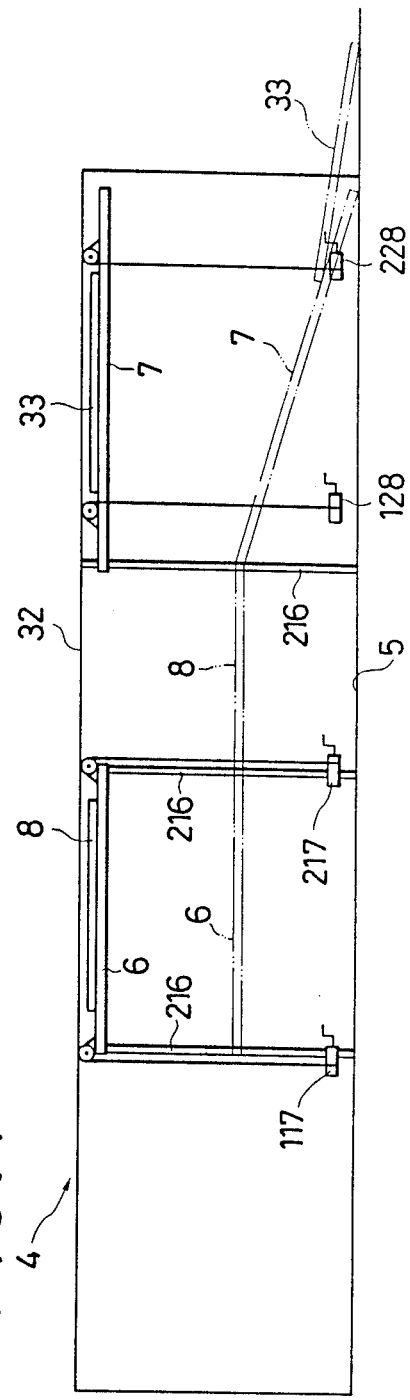
FIG. 7 is an explanatory view illustrating the state of tucking decks and an auxiliary plate.

As shown in FIG. 2, rear deck elevation mechanisms 128 and 228 of an identical structure with each of the front deck elevation mechanisms 117 and 217 described above are disposed to both front and rear ends of the rear deck 7 respectively, so that the rear deck 7 may be moved up and down between the tucking position shown by the solid line to the loading position shown by the dotted chain line in FIG. 7 by operating the rear deck elevation mechanisms 128 and 228.

Further, the intermediate deck 8 comprises, as shown in FIGS. 2 and 4, two ladder-like connection members 29 and upper surface members 30 such as made of mesh disposed on the upper surface thereof. As shown in FIG. 6, L-shaped metals 31 are secured respectively to both front and rear ends of each of the connection members 29 for detachably mounting each of the connection members 29 between the rear lateral beam 21 and the lateral beam 23. The intermediate deck 8 is placed on and secured to the front deck 6 when the front deck 6 is lifted and tucked at a position just beneath the ceiling wall 32 of the container main body 4 as shown by the solid line in FIG. 7.

In FIG. 1, reference numeral 33 denotes an auxiliary plate disposed to a portion of the door 3 upon loading the cars $C_1$, $C_2$, $C_3$ and $C_4$ to the inside of the container main body 4, so that the step of the height at the portion of the door 3 can be moderated by the disposition of the auxiliary plate 33. As shown in FIG. 7, the auxiliary plate 33 is placed on and secured to the rear deck 7 when the rear deck 7 is lifted and tucked at a position just below the ceiling wall 32 of the container main body 4 as shown by the solid line in FIG. 7.

OPERATION OF THE CONTAINER

The operation of the container in this embodiment will be explained below.

Upon loading each of the cars $C_1$, $C_2$, $C_3$ and $C_4$, the rear deck 7 is lowered from a state in which the decks 6, 7 and 8 and the auxiliary plate 33 are tucked respectively just below the ceiling wall 32 of the container main body 4, the auxiliary plate 33 is detached and disposed at the portion of the door 3 as shown in FIG. 7 and then the rear deck 7 is again lifted to the tucking position.

Then, the lower stage car $C_1$ is caused to run backwardly by itself and loaded to a predetermined position on the floor surface 5 of the container main body 4 and then fastened by means of predetermined fastening means. In this case, the lower stage car $C_1$ is loaded closer to the side wall 16 on the left as viewed from the side of the door 3 so that a large space can be afforded on the side where a driver gets on and off the car.

Next, the front deck 6 is lowered and disposed to a state shown in FIG. 1 and the rear deck 7 is also lowered and set to a state shown by the dotted chain line in FIG. 1. Then, the intermediate deck 8 is set between both of the decks 6 and 7 as shown by the dotted chain line in FIG. 1. In this way, the front deck 6 is set at a position for loading the upper stage car $C_3$ and the front deck guide mechanism 9 is constituted for loading the upper stage car $C_3$ by self-running on the front deck 6. Then, the upper stage car $C_3$ is loaded on the front deck 6 by way of the front deck guide mechanism 9 and then secured by means of a predetermined fastening means.

Then, the intermediate deck 8 is detached and settled, for example, by standing against the inner surface of the side wall 16 of the container main body 4, and the rear deck 7 is lifted to such a position so as not to be a hindrance. Then, the lower stage car $C_2$ is loaded and secured forwardly on the floor surface 5 of the container main body 4. The lower stage car $C_2$, different from the lower stage car $C_1$, is loaded closer to the side wall 16 on the right as viewed from the side of the door 3.

Finally, the rear deck 7 is lowered and set to a state shown by the solid line in FIG. 1 and the upper stage car $C_4$ is loaded on and secured to the rear deck 7 by self-running. Then, the auxiliary plate 33 is detached and secured, e.g., by standing against on the inner surface of the side wall 16 of the container main body 4.

Each of the cars $C_1$, $C_2$, $C_3$ and $C_4$ loaded to the inside of the container main body 1 can be unloaded by procedures reverse of those in the loading operation as described above.

While on the other hand, in a case where the container 1 is used as an ordinary dry container, both of the decks 6 and 7 are lifted and tucked just below the ceiling wall 32 of the container main body 4 while placing and securing the intermediate deck 8 on the front deck 6 and the auxiliary plate 33 on the rear deck 7 respectively as shown in FIG. 7. Since these portions are scarcely utilized as an effective space for loading goods in the case of using the container 1 as an ordinary dry container, there are no particular problems at all.

Namely, the upper end of the door 3 and the lower surface of the ceiling wall 32 is inevitably deviated by a predetermined vertical dimension L (usually about 10 cm) in view of the container structure as shown in FIG. 3. Then, in the usual case of loading general cargo to the inside of the container 1 by using a fork lift, etc., since cargoes lower in the height than the opening height of the door 3 are usually entered to the inside of the container 1 and loaded in a single stage, a dead space of a height equal to the deviation L always remains at a position just beneath the ceiling wall 32. Since each of the decks 6, 7 and 8 and the auxiliary plate 33 are tucked within this space, there is no worry that the effective load capacity of the container 1 is reduced.

In the case of carrying small sized cargo to the inside of the container 1 and loaded at a plurality of stages, the space of the vertical dimension L may occasionally be utilized as the working space etc. upon loading cargo. However, such a situation may seldom occur except for a case where the total height of cargo stacked by a plurality of stages happens to be substantially equal with the height from the floor surface 5 to the ceiling wall 32. Accordingly, there is no disadvantage at all for tucking each of the decks 6, 7 and 8 and the auxiliary plate 33 just below the ceiling wall 32.

Since the loading faces $F_3$ and $F_4$ of each of the decks 6 and 7 for loading the upper stage cars $C_3$ and $C_4$ are entirely or partially situated below the top end of the lower stage cars $C_1$ and $C_2$, respective upper and lower stage cars $C_1$, $C_2$, $C_3$ and $C_4$ are loaded while being partially overlaped with each other in the vertical direction and the size of the container main body 4 in the direction of the height can be decreased by so much. Further, since the front deck 6 is situated between both of the lower stage cars $C_1$ and $C_2$ with the front parts thereof being face-to-face with each other, the position for the loading face $F_3$ can be sufficiently low. In addition, since the loading face $F_4$ of the rear deck 7 is sloped upwardly toward the front, the upper stage car $C_4$ can be loaded while effectively utilizing the space in the container main body 4.

Although the explanations have been made to the first embodiment in which the lower stage car $C_1$ is loaded backwardly, it may be loaded forwardly in the same manner as that in other cars $C_2$, $C_3$ and $C_4$. In this case, if the lower stage car $C_1$ and the front deck 6 should be in contact with each other, the front deck 6 may be disposed with a slight upward slope toward the front.

Figure 8:
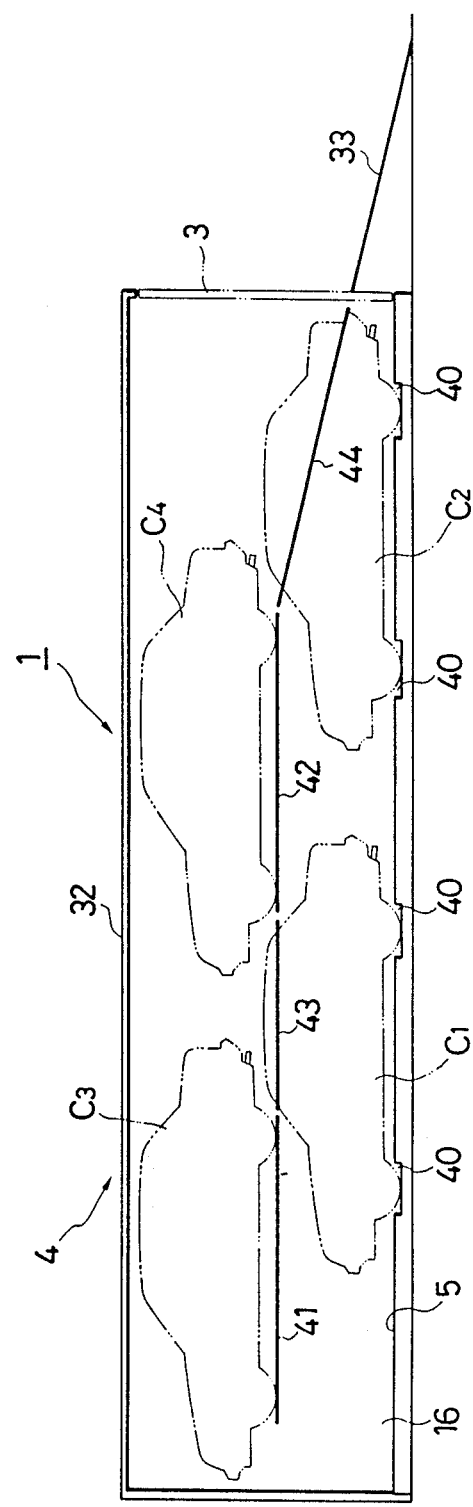
FIG. 8 is a view illustrating a second embodiment according to the present invention in the manner corresponding to FIG. 1.

FIG. 8 shows the second embodiment of the present invention, in which recesses 40 are formed on the floor surface 5 of the container main body 4 for receiving the tires of each of lower stage cars $C_1$ and $C_2$, and a front deck 41 and a rear deck 42 for loading and unloading upper stage cars $C_3$ and $C_4$ respectively are disposed while being displaced in the longitudinal direction relative to lower stage cars $C_1$ and $C_2$ respectively.

Specifically, as shown in FIG. 8, both of the decks 41 and 42 have the same constitution as the front deck 6 in the first embodiment described above in which the upper stage cars $C_3$ and $C_4$ are loaded and held horizontally, and the decks are tucked just below the ceiling wall 32 of the container main body 4 when they are not used.

As shown in FIG. 8, an intermediate deck 43 of an identical constitution with the intermediate deck 8 in the first embodiment is detacheably mounted between both of the decks 41 and 42, a slope mechanism 44 with a downward slope toward the door 3 is connected to the end of the rear deck 42 on the side of the door 3, and an auxiliary plate 33 is connected to the lower end of the slope mechanism 44. The auxiliary plate 33 and the slope mechanism 44 constitute a rear deck guide mechanism for loading the upper stage car $C_4$ by driving to the rear deck 42, while the auxiliary plate 33, the slope mechanism 44, the rear deck 42 and the intermediate deck 43 constitute a front deck guide mechanism for loading the upper stage car $C_3$ by self-running on the front deck 41.

The slope mechanism 44 has a constitution identical with the rear deck 7 in the first embodiment except for the lateral beam 23 which is removed in this second embodiment. The upper end of the slope mechanism 44 is swingeably and detacheably connected by means of pins to the rear deck 42, while the lower end of the mechanism 44 is supported at a predetermined height to both side walls 16 of the container main body 4.

The second embodiment has quite the same constitution as that in the first embodiment for other respects.

Accordingly, the same effects as those in the first embodiment can be obtained also in this embodiment. Further, since the loading position for the lower stage cars $C_1$ and $C_2$ is lowered by the depth of the recess 40, the size of the container 1 in the direction of the height can be reduced by so much. In addition, since the directions of all of the cars $C_1$, $C_2$, $C_3$ and $C_4$ are identical with each other a wide space is available throughout the longitudinal direction on one side wall 16 of the container main body 4 (on the left as viewed from the side of the door 3 in the case of a left-handle car, and on the right as viewed from the side of the door 3 in the case of a right-handle car), and the space can easily be utilized as a loading space for spare parts.

While the explanations have been made to the second embodiment for a case in which the upper cars $C_3$ and $C_4$ are loaded horizontally on both of the decks 41 and 42, the front deck 41 may alternatively be disposed with a downward slope toward the front.

With such an arrangement, a margin can be afforded for the loading space and each of the cars $C_1$, $C_2$, $C_3$ and $C_4$ can be loaded with no trouble even when they are large-sized cars.

If the front deck 41 has the same structure as that of the front deck 6 in the first embodiment, it would be impossible to provide the deck 41 with a downward slope toward the front.

The front deck 41, which is held horizontally upon tucking, can be provided with a downward slope toward the front upon loading the car, for example, by making the connection between the guide metals 15 and the lateral beams 10 and 11 shown in FIG. 5 movable relative to each other by means of long holes.

FIG. 9 shows a main portion of the third embodiment according to the present invention. A support member 50 is disposed to a support post 216 constituting the side wall 16 of a container main body 4 such that the member 50 can protrude in a triangular configuration from and can be foldable linearly along the support post 216 within a guide long 51 as a guide. The decks 6, 7, 41, 42 or the slope mechanism 44 in each of the embodiments described above are placed on and supported by the support member 50 and elevated only by means of elevation mechanisms 117, 217, 128 and 228 while saving the guide metals 15.

With such a constitution, it is not necessary to elevate each of the decks 6, 7, 41, 42 or the slope mechanism 44 along the support post 216 as the guide and their orthogonal disposition is facilitated.

FIG. 10 shows a portion of the fourth embodiment according to the present invention. Openings 60 are formed to each of the decks 6, 7, 41 and 42 for receiving the tires of the upper stage cars C₃ and C₄ in each of the embodiments described above. Each of the openings 60 is closed by a lid 62 which opens or closes around a hinge 61 as a fulcrum. The lid 62 opens to the position shown by the dotted chain line, thereby opening the opening 60 upon loading the upper stage cars C₃ and C₄, and the lid 62 also functions as a stopper for controlling the loading position also of the upper stage cars C₃ and C₄.

With such a constitution, each of the decks 6, 7, 41 and 42 can be situated at a higher position to provide a sufficient vertical gap relative to the lower stage cars C₁ and C₂ and, moreover, the loading position for the upper stage cars C₃ and C₄ can be made lower to provide a sufficient space relative to the ceiling wall 32 of the container main body 4. Further, setting of the loading position and fastening for the upper stage cars C₃ and C₄ are facilitated.

Figure 11:
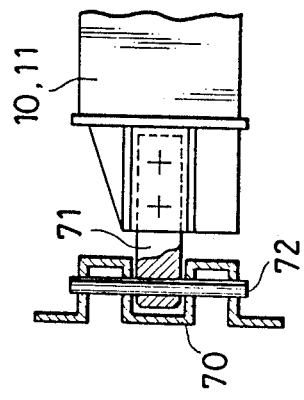
FIG. 11 is a plan view illustrating a portion of a fifth embodiment according to the present invention.
Figure 12:
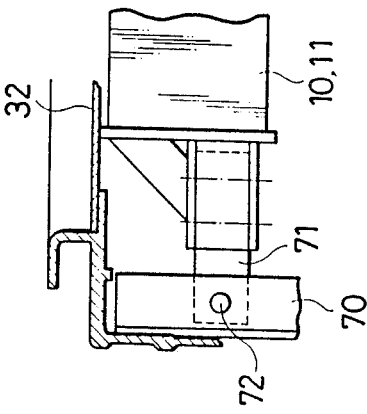
FIG. 12 is a front elevational view for the portion shown in FIG. 11.

FIGS. 11 and 12 show a portion of the fifth embodiment according to the present invention, in which a support post 70 and a guide metal 71 are used instead of the support post 216 and the guide metal 15 in the first embodiment, so that the strength resistive to the force exerting on the container 1 in the longitudinal direction can be improved.

That is, the support post 70 has a generally W-shaped transverse cross section which is approximate to a shape formed by outwardly convexing the lateral middle portion of the support post 216 as shown in FIG. 11, while the guide metal 71 has, as shown in FIGS. 11 and 12, a solid square post-like configuration, the top end of which is engaged to the recess at the lateral center of the support post 70. In FIGS. 11 and 12, reference numeral 72 represents a pin for securing the lateral beams 10 and 11 just below the ceiling wall 32.

By the use of the support post 70 of the W-shaped transverse cross section, strength resistive to the force exerting on the container 1 in the longitudinal direction can be improved without increasing the wall thickness of the support post 70.

Figure 13:
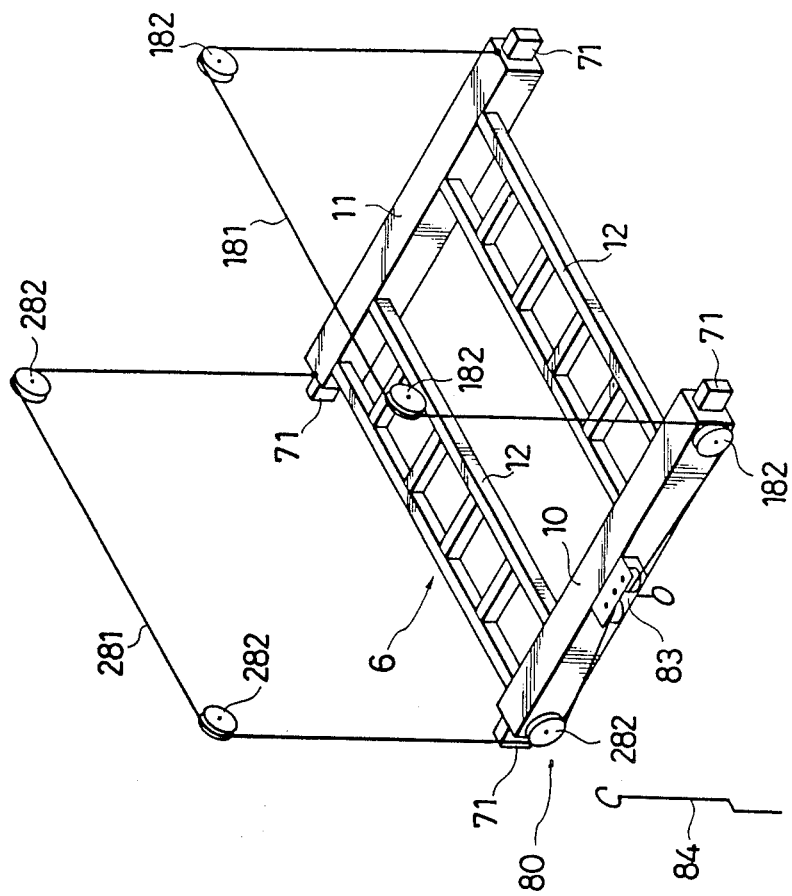
FIG. 13 is an explanatory view illustrating a portion of a sixth embodiment according to the present invention.

FIG. 13 shows the sixth embodiment according to the present invention, in which a front deck elevation mechanism 80 is used instead of the front deck elevation mechanisms 117 and 217 shown in the first embodiment described above.

That is, the front deck elevation mechanism 80 comprises, as shown in FIG. 13, a lift wire 181 one end of which is secured to one lateral end of a rear lateral beam 11 while the other end of which is pulled out by way of three pulleys 182 in front of the front lateral beam 10, and a lift wire 281 one end of which is secured to the other lateral end of the rear lateral beam 11 while the other end of which is pulled out by way of three pulleys 282 in front of the front lateral beam 10. The free ends of both of the lift wires 181 and 281 are wound around a winch 83 secured to the central portion in front of the front lateral beam 10 for winding and rewinding both of the lift wires 181 and 281 simultaneously as shown in FIG. 13. The winch 83 is so adapted that it can be operated by a detachable operation lever 84 as shown in FIG. 13 so that it may be moved up and down together with the front deck 6 by the winding and rewinding for both of the lift wires 181 and 281.

By the use of the front deck elevation mechanism 80, when the front deck 6 is tucked just below the ceiling wall 32, the front deck elevation mechanism 80 is tucked as well. Accordingly, a loading space for general cargo can be secured without applying complicated fabrication such as incorporation of the winch 83 within the wall thickness of the side wall 16 of the container 1 thereby simplifying the structure. Such a constitution of the front deck elevation mechanism 80 can be applied in the same manner also to the rear deck elevation mechanisms 182 and 228 described previously.

The present invention is not limited to each of the foregoing embodiments. For instance, each of the deck elevation mechanisms 117, 217, 128, 228, 80, etc. may be constituted by using a balancer, or may be modified as a motor-driven system, etc. Further, support posts disposed separately from the constituent members for the side wall 16 may be used as the support posts 216. Moreover, ridged members may be disposed to each of the decks 6, 7, 8, 41, 42 and 43, auxiliary plate 33 and slope mechanism 44 so that car wheels can be prevented from falling off upon loading and reloading the upper stage cars C₃ and C₄.

In addition, while explanations have been made for each of the embodiments by taking the illustrated box-type container as an example of a transportation container, it can be applied, with similar effects, also to a van trailer or other transportation container in which the container main body forms an integral structure with a trailer vehicle.

As has been described above according to the present invention, since at least a portion of the loading faces of both of the decks for loading the upper stage cars is situated below the top end of the lower stage cars, the upper and lower stage cars are loaded while using being partially overlapped with each other in the vertical direction and the dimension of the container main body in the direction of height can be reduced by so much. Further, since the upper stage cars to be loaded on both of the decks can be loaded by driving of the cars therein while utilizing the guide mechanism for each of the decks and it is not necessary to displace both of the decks after loading, there is no requirement for the operation using a large-sized chain block or fork lift, which can improve the working efficiency and simplify the structure. In addition, since both of the decks can be lifted by the elevation mechanism and tucked just below the ceiling wall of the container main body, they are not a hindrance when loading general cargo and the reduction of the loading space for the general cargo can be minimized.

As many apparently widely different embodiments of this invention may be made without departing from the spirit and scope thereof, it is to be understood that the invention is not limited to the specific embodiments thereof except as defined in the appended claims.

What is claimed is:

1. A convertible transportation container adapted for loading finished cars and, alternatively, loading general cargo comprising:
   a longitudinal main body having opposed top and bottom and side walls and having a door at one longitudinal end thereof, through which first and second lower cars can be loaded onto said bottom wall;

a front deck mounted on and supported by both side walls of the container main body and adapted to have a finished first upper car loaded thereon said first upper car being displaced in the longitudinal direction relative to both of said first and second lower cars located on said bottom wall, at least a portion of said first upper car on said front deck being disposed below the top end of said first and second lower cars on said bottom wall;

a rear deck having at least the end thereof on the front side supported by both of the side walls of the container main body respectively, said rear deck having a loading face adapted to have a finished second upper car loaded thereon while displacing the position of said second upper car in the longitudinal direction relative to both of said first and second lower cars, at least a portion of the loading face being disposed below the top end of said first and second lower cars said rear deck guiding said first upper car when driven onto the front deck and said second upper car when driven onto the rear deck;

elevation mechanisms for lifting the front and rear decks and tucking said decks just below the top wall of said longitudinal main body.

2. A transportation container as defined in claim 1, wherein said loading face of the front deck is made substantially horizontal or sloped downwardly toward the front when loading said first upper car on said front deck.

3. A transportation container as defined in claim 1, wherein the loading face of the rear deck has a downward slope so that the end thereof on the side of the door is in contact with or brought closer to the bottom wall of the container main body when loading said second upper car on said rear deck.

4. A transportation container as defined in claim 3, wherein an intermediate deck is laid over between the front and rear decks.

* * * * *